(12) United States Patent
Andersen et al.

(10) Patent No.: US 9,028,606 B2
(45) Date of Patent: May 12, 2015

(54) EXTRUDED FIBER REINFORCED CEMENTITIOUS PRODUCTS HAVING STONE-LIKE PROPERTIES AND METHODS OF MAKING THE SAME

(75) Inventors: Per Just Andersen, Santa Barbara, CA (US); Simon K. Hodson, Santa Barbara, CA (US)

(73) Assignee: E. Khashoggi Industries, LLC, Santa Barbara, CA (US)

( * ) Notice: Subject to any disclaimer, the term of this patent is extended or adjusted under 35 U.S.C. 154(b) by 210 days.

(21) Appl. No.: 13/511,493

(22) PCT Filed: Nov. 19, 2010

(86) PCT No.: PCT/US2010/057446
§ 371 (c)(1),
(2), (4) Date: May 23, 2012

(87) PCT Pub. No.: WO2011/066192
PCT Pub. Date: Jun. 3, 2011

(65) Prior Publication Data
US 2012/0270971 A1    Oct. 25, 2012

Related U.S. Application Data

(63) Continuation of application No. 12/624,911, filed on Nov. 24, 2009, now abandoned.

(51) Int. Cl.
| | | |
|---|---|---|
| C04B 16/06 | (2006.01) |
| C04B 24/00 | (2006.01) |
| B28B 1/52 | (2006.01) |
| B28B 3/20 | (2006.01) |
| B28B 3/26 | (2006.01) |
| B28B 11/00 | (2006.01) |
| C04B 14/06 | (2006.01) |
| C04B 18/26 | (2006.01) |
| C04B 24/38 | (2006.01) |
| C04B 28/02 | (2006.01) |
| C04B 40/00 | (2006.01) |
| C04B 40/02 | (2006.01) |
| C04B 103/30 | (2006.01) |
| C04B 111/00 | (2006.01) |

(52) U.S. Cl.
CPC . *C04B 28/02* (2013.01); *B28B 1/52* (2013.01); *B28B 1/525* (2013.01); *B28B 3/20* (2013.01); *B28B 3/26* (2013.01); *B28B 11/003* (2013.01); *C04B 14/06* (2013.01); *C04B 16/0641* (2013.01); *C04B 18/26* (2013.01); *C04B 24/383* (2013.01); *C04B 40/0028* (2013.01); *C04B 40/024* (2013.01); *C04B 2103/30* (2013.01); *C04B 2111/00129* (2013.01); *C04B 2201/20* (2013.01); *C04B 2201/50* (2013.01)

(58) Field of Classification Search
USPC ........ 106/638, 712, 808, 805; 264/211; 524/4
See application file for complete search history.

(56) References Cited

U.S. PATENT DOCUMENTS

| 4,428,775 A | 1/1984 | Johnson et al. |
| 5,654,048 A * | 8/1997 | Andersen et al. ............ 428/34.5 |
| 6,286,577 B1 | 9/2001 | Douglas et al. |
| 6,528,151 B1 | 3/2003 | Shah et al. |
| 6,858,074 B2 | 2/2005 | Anderson et al. |

FOREIGN PATENT DOCUMENTS

| CN | 1083792 | 3/1994 |
| CN | 13988705 A | 2/2003 |
| WO | 2007053852 A2 | 5/2007 |

OTHER PUBLICATIONS

Office Action received in CN 201080062134.6, mailed Nov. 27, 2013.
International Search Report and Written Opinion received in PCT/US2010/057446 mailed Feb. 10, 2011.
Office Action received in CN 200680049092.6, mailed Jan. 19, 2011.

* cited by examiner

*Primary Examiner* — Robert D. Harlan
(74) *Attorney, Agent, or Firm* — Venable, LLP.; Stefan J. Kirchanski

(57) ABSTRACT

A cementitious composite product that can function as a substitute for stone and solid surface materials, such as granite, marble, and engineered stone is provided. Furthermore methods for manufacturing the cementitious composite product using an extrudable cementitious composition that can be extruded or otherwise shaped into stone-like building products that can be used as a substitute for many known stone products is disclosed. In one embodiment, the cementitious composite products can be manufactured more cheaply to be as tough or tougher and more durable than stone and solid surface materials.

27 Claims, 2 Drawing Sheets

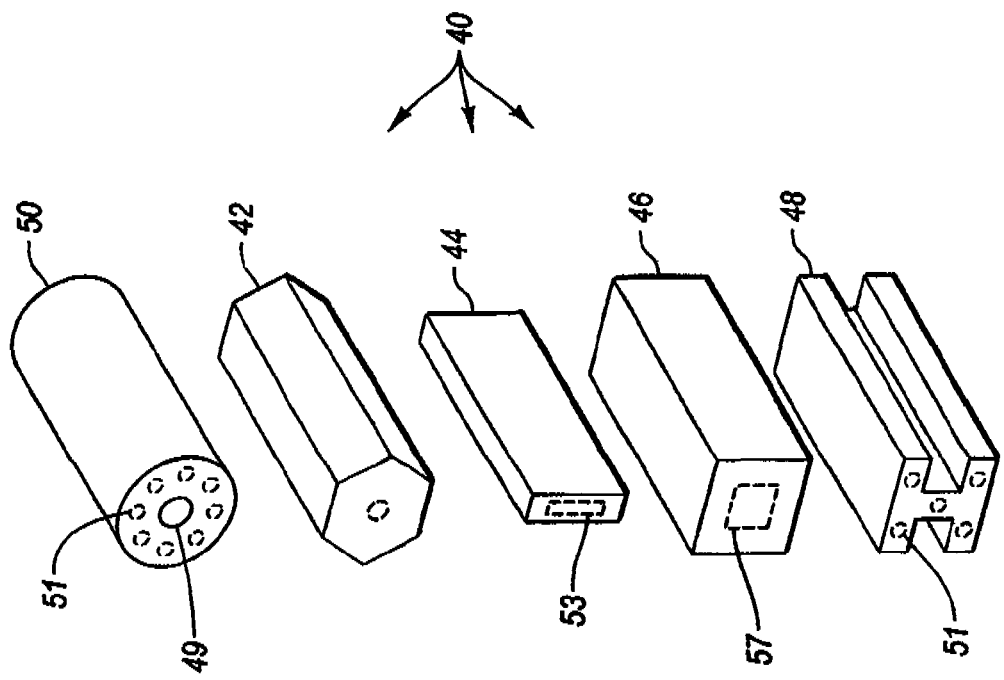
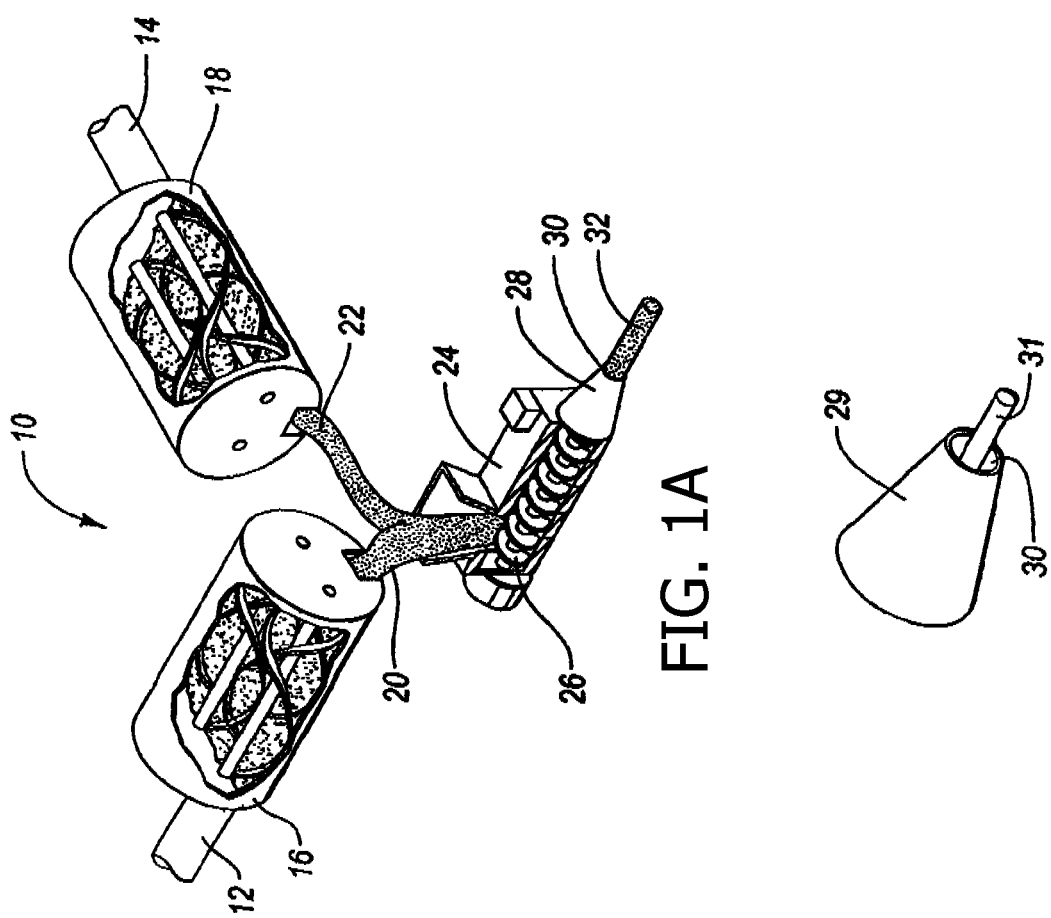

EXTRUDED FIBER REINFORCED CEMENTITIOUS PRODUCTS HAVING STONE-LIKE PROPERTIES AND METHODS OF MAKING THE SAME

CROSS REFERENCE TO RELATED APPLICATIONS

This patent application is a U.S. National Phase patent application of International Application Serial No. PCT/US2010/057446 filed on Nov. 19, 2010, which claims priority from U.S. patent application Ser. No. 12/624,911 filed on Nov. 24, 2009 now abandoned. The entire text of each of these applications is hereby incorporated by reference in their entireties.

BACKGROUND OF THE DISCLOSURE

The present disclosure relates generally to cementitious building products that contain high amounts of reinforcing fibers and more particularly, to extrudable compositions for use in making ultra-high strength cementitious composite building products having stone-like properties.

The success of the building and construction industry is in large part determined by the properties available for use in construction. Many materials have been used historically and currently but each has one or more significant limitations, as further described in the following chart.

| Building Materials | Flexural Strength [MPa] | Bulk Density [g/cm³] | Installed Cost/kg [US$/kg] | Specific Value (Flexural Strength/ Installed Cost/kg) | Brittleness [Y/N] | Good Aesthetics |
|---|---|---|---|---|---|---|
| Wood | 75 | 0.5 | 4 | 18.75 | N | Y |
| Eternit | 10 | 1.4 | 4 | 2.5 | N | N |
| Steel | 400 | 7.9 | 20 | 20 | N | N |
| Concrete | 3 | 2.3 | 0.13 | 23.08 | Y | N |
| Granite/Marble | 18 | 2.5 | 6 | 3.0 | Y | Y |
| Fiber reinforced cementitious product | 30 | 1.3-2.3 | 0.50 | 60 | N | Y |

As the availability of high quality natural occurring materials such as stone and wood become scarcer, the need for manufactured products becomes increasingly more important. Specifically, there is a need in the design and construction of buildings with concrete and steel for manufactured products having high durability, low cost, high strength and toughness per unit of mass, and that are aesthetically pleasing.

Moreover, in conventional building products, 90% of the concrete mass and volume is required just to support itself in position and shape; only 10% is actually used in the dynamic or live loading capacity of the structure. Similarly, 75% of the mass and volume of steel used in a building is to support itself and hold its position and shape; only 25% is actually used in the dynamic or live loading capacity of the structure. Furthermore, although concrete has historically been recognized as having high compressive strength, the compressive strength of concrete is not usable. Rather, it is its flexural or tensile strength that is required, and the flexural or tensile strength is so low that in most cases it is assumed to be zero.

Based on the foregoing, it would be a great advantage and advance in the construction industry to have cementitious product that could be molded and shaped locally but would have a much higher flexural and tensile strength so that little or no steel reinforcing would be required in the structure. It would be a further advantage if such cementitious material would be of a lower bulk density and have a much improved bulk density ratio. This would increase the amount of concrete available for the dynamic loading capacity of the building.

Previous attempts to use fiber reinforcing concrete have been generally limited by many factors. One factor is the difficulty of uniformly mixing and distributing fibers more than 3% by volume throughout a high strength water cement ratio composition. The second factor is the rapid reduction in rheology of the concrete makes the shaping and placing of the concrete material much more difficult.

Accordingly, it would be advantageous to provide a cementitious composite product and method for making the cementitious composite product to be used in building products as a cost-effective substitute for stone and solid surface materials. The cementitious composite product could be manufactured to be tougher and more durable (i.e., less brittle) than stone and solid surface materials without using reinforcing members such as rebar. Moreover, it would be beneficial to provide cementitious composite products that could be used as a substitute for stone materials.

SUMMARY OF THE DISCLOSURE

The present disclosure relates to cementitious composite products (also referred to as building products or cementitious composite building products) that can function as a substitute for stone and solid surface materials. Specifically, the disclosed compositions and manufacturing processes have an increased flexural and tensile strength by more than 10 times as compared to conventional products. The products provide for easy molding and shaping for a wide variety of usable construction materials or products. Further, the compositions and processes make cementious building materials that are highly aesthetically pleasing at a much reduced cost and weight. These cementitious materials are not brittle and do not chip or crack like natural synthetic stone commonly used in construction. Additionally, they have all the advantages of standard Portland Cement Concrete but are 10 times stronger and 100 times tougher at ⅓ less weight. The products are non flammable, highly durable and can be manufactured locally. A final advantage of these materials is that they obtain all required strength for use within 24 to 48 hours and do not need the typical 28 day period of other cementitious materials peak performance requirement.

Accordingly, in one aspect, the present disclosure is directed to a cementitious composite product having stone-like properties. The product comprises an extrudable cementitious composition comprised of a hydraulic cement, aggregate, a rheology-modifying agent, and fibers substantially homogeneously distributed through the extrudable cementitious composition and included in an amount greater than about 2% (by volume of the extrudable cementitious composition). The cementitious composite product has a hardness value of at least 4 MOH and a bulk density of from about 1.3 g/cm³ to about 2.3 g/cm³.

In another aspect, the present disclosure is directed to a method for manufacturing a cementitious composite product having stone-like properties. The method comprises: mixing together water, fibers and a rheology-modifying agent to form a fibrous mixture in which the fibers are substantially homogeneously dispersed; adding a mix of hydraulic cement and aggregate to the fibrous mixture to yield an extrudable cementitious composition having a plastic consistency and which includes fiber at a concentration greater than about 2% by volume of extrudable cementitious composition; extruding the extrudable cementitious composition into a green intermediate extrudate having a predefined cross-sectional area, the extrudate being form-stable upon extrusion and capable of retaining substantially the cross-sectional area so as to permit handling without breakage; and causing or allowing the hydraulic cement to cure to form the cementitious composite product, wherein the cementitious composite product has a hardness value of at least 4 MOH and a bulk density of from about 1.3 $g/cm^3$ to about 2.3 $g/cm^3$.

Other objects and features will be in part apparent and in part pointed out hereinafter.

BRIEF DESCRIPTION OF THE DRAWINGS

FIG. 1A is a schematic diagram that illustrates an embodiment of an extruding process for manufacturing a cementitious composite building product;

FIG. 1B is a schematic diagram that illustrates an embodiment of an extruding die head for manufacturing a cementitious composite building product having a continuous hole extending therethrough;

FIG. 1C is a perspective view that illustrates embodiments of the cross-sectional areas of extruded cementitious composite building products.

DETAILED DESCRIPTION OF THE DISCLOSURE

Figure 2:
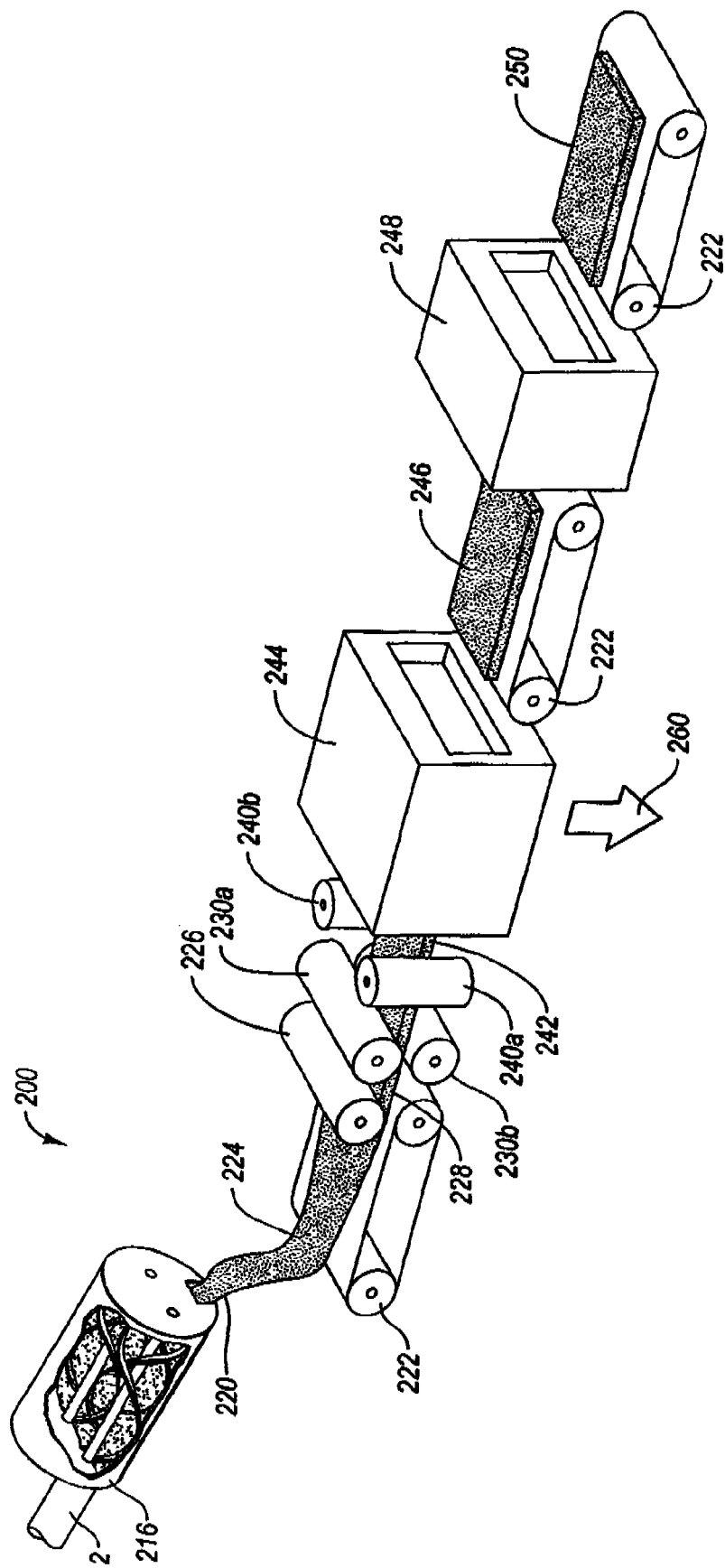
FIG. 2 is a schematic diagram that illustrates an embodiment of a roller-extrusion process for manufacturing a cementitious composite building product.

It has been found that cementitious composite products can be made to have stone-like properties so as to be cheaper and more durable substitutes for stone and solid surface products, such as countertops, tiles, cladding, roof tiles, and the like, as well as other non-architectural products such as pre-cast and pre-formed materials. The terminology employed herein is used for the purpose of describing particular embodiments only and is not intended to be limiting.

The terms "aggregate" and "aggregate fraction" refer to the fraction of concrete which is generally non-hydraulically reactive. The aggregate fraction is typically comprised of two or more differently-sized particles, often classified as fine aggregates and coarse aggregates.

As used herein, the terms "fine aggregate" and "fine aggregates" refer to solid particulate materials that are sized at less than 5 mm.

As used herein, the terms "coarse aggregate" and "coarse aggregates" refer to solid particulate materials that are retained on a Number 4 sieve (ASTM C125 and ASTM C33). Examples of commonly used coarse aggregates include ⅜ inch rock and ¾ inch rock.

The term "multi-component" refers to fiber-reinforced extrudable cementitious compositions and extruded composite products prepared therefrom, which typically include three or more chemically or physically distinct materials or phases. For example, these extrudable cementitious compositions and resulting building products can include components such as rheology-modifying agents, hydraulic cements, other hydraulically settable materials, set accelerators, set retarders, fibers, inorganic aggregate materials, organic aggregate materials, dispersants, water, and other liquids. Each of these broad categories of materials imparts one or more unique properties to extrudate compositions prepared therefrom as well as to the final product. Within these broad categories it is possible to further include different components (such as two or more inorganic aggregates or fibers) which can impart different, yet complementary, properties to the extruded product.

The terms "hydraulically settable composition" and "cementitious composition" are meant to refer to a broad category of compositions and materials that contain both a hydraulically settable binder and water as well as other components, such as aggregates and fibers, regardless of the extent of hydration or curing that has taken place. As such, the cementitious materials include hydraulic pastes or hydraulically settable compositions in a green state (i.e., unhardened, soft, or moldable), and a hardened or cured cementitious composite product.

The term "homogeneous" is meant to refer to a composition to be evenly mixed so that at least two random samples of the composition have roughly or substantially the same amount, concentration, and distribution of a component.

The terms "hydraulic cement," "hydraulically settable binder," "hydraulic binder," or "cement" are meant to refer to the component or combination of components within a cementitious or hydraulically settable composition that is an inorganic binder such as, for example, Portland cements, fly ash, and gypsums that harden and cure after being exposed to water. These hydraulic cements develop increased mechanical properties such as hardness, compressive strength, tensile strength, flexural strength, and component surface bonds (e.g., binding of aggregate to cement) by chemically reacting with water.

The terms "hydraulic paste" or "cement paste" are meant to refer to a mixture of hydraulic cement and water in the green state as well as hardened paste that results from hydration of the hydraulic binder. As such, within a hydraulically settable composition, the cement paste binds together the individual solid materials, such as fibers, cement particles, aggregates, and the like.

The terms "fiber" and "fibers" include both natural and synthetic fibers. Fibers typically having an aspect ratio of at least about 10:1 are added to an extrudable cementitious composition to increase the elongation, deflection, toughness, and fracture energy, as well as flexural and tensile strengths of the resulting extruded composite or finished building product. Fibers reduce the likelihood that the green extrudate, extruded products, and hardened or cured products produced therefrom will rupture or break when forces are applied thereto during handling, processing, and curing. Also, fibers can absorb water and reduce the effective water/cement ratio.

The term "fiber-reinforced" is meant to refer to fiber-reinforced cementitious compositions that include fibers so as to provide some structural reinforcement to increase a mechanical property associated with a green extrudate, extruded products, and hardened or cured composites as well as the building products produced therefrom. Additionally, the key term is "reinforced," which clearly distinguishes the extrudable cementitious compositions, green extrudate, and cured building products of the present disclosure from conventional settable compositions and cementitious products. The fibers act primarily as a reinforcing component to specifically add tensile strength, flexibility, and toughness to the building products as well as to reinforce any surfaces cut or formed thereon. Because they are substantially homogeneously dispersed, the building products do not separate or delaminate when exposed to moisture as can products made using the conventional processes.

The term "mechanical property" is meant to include a property, variable, or parameter that is used to identify or characterize the mechanical strength of a substance, composition, or product of manufacture. Accordingly, a mechanical property can include the amount of elongation, deflection, or compression before rupture or breakage, stress and/or strain before rupture, tensile strength, compressive strength, Young's Modulus, stiffness, hardness, deformation, resistance, and the like.

The terms "extrudate," "extruded shape," or "extruded product," are meant to include any known or future designed shape of products that are extruded using the extrudable cementitious compositions and methods of the present disclosure. For example, the extruded composite can be prepared into countertops, tiles, cladding, and roof tiles. Additionally, an extruded building product can initially be extruded as a "rough shape" and then shaped, ground, milled or otherwise refined into a product of manufacture, which is intended to be included by use of the present terms.

The term "extrusion" can include a process where a material is processed or pressed through an opening or through an area having a certain size so as to shape the material to conform with the opening or area. As such, an extruder pressing a material through a die opening can be one form of extrusion. Alternatively, roller-extrusion, which includes pressing a composition between a set of rollers, can be another form of extrusion. Roller-extrusion is described in more detail below in FIG. 2. In general, extrusion refers to a process that is used to shape a moldable composition without cutting, milling, sawing or the like, and usually includes pressing or passing the material through an opening having a predefined cross-sectional area.

The terms "hydrated" or "cured" are meant to refer to a level of a hydraulic reaction which is sufficient to produce a hardened cementitious building product having obtained a substantial amount of its potential or maximum strength. Nevertheless, cementitious composites or extruded building products may continue to hydrate or cure long after they have attained significant hardness and a substantial amount of their maximum strength.

The terms "green," "green material," "green extrudate," or "green state" are meant to refer to the state of a cementitious composition which has not yet achieved a substantial amount of its final strength; however, the "green state" is meant to identify that the cementitious composition has enough cohesiveness to retain an extruded shape before being hydrated or cured. As such, a freshly extruded extrudate comprised of hydraulic cement and water should be considered to be "green" before a substantial amount of hardening or curing has taken place. The green state is not necessarily a clear-cut line of demarcation as to the amount of curing or hardening that has taken place, but should be construed as being the state of the composition prior to being substantially cured. Thus, a cementitious composition is in the green state post extrusion and prior to being substantially cured.

The term "form-stable" is meant to refer to the condition of a green extrudate immediately upon extrusion which is characterized by the extrudate having a stable structure that does not deform under its own weight. As such, a green extrudate that is form-stable can retain its shape during handling and further processing.

The term "composite" is meant to refer to a form-stable composition that is made up of distinct components such as fibers, rheology-modifiers, cement, aggregates, set accelerators, and the like. As such, a composite is formed as the hardness or form-stability of the green extrudate increases, and can be prepared into a building product.

The term "stone-like" or "stone-like properties" is meant to refer to cementitious compositions and extruded cementitious composite building properties having a hardness value of at least 4 MOH, more suitably, at least about 5 MOH, even more suitably a hardness of at least about 6 MOH, and even more suitably a hardness of 7 to 8 MOH.

In one aspect, a cementitious composite product having stone-like properties is provided. The composite product includes an extrudable cementitious composition. The cementitious composite product has a hardness value of at least 4 MOH and a bulk density of at least 1.3 g/cm$^3$. More suitably, the cementitious composite product has a bulk density of from about 1.3 g/cm$^3$ to about 2.3 g/cm$^3$.

Extrudable Cementitious Compositions Used to Make the Cementitious Composite Product The extrudable cementitious compositions used to make extruded cementitious composite building products include water, hydraulic cement, fibers, aggregate, a rheology-modifying agent, and optionally, a set accelerator or a set retarder. In addition to these components, the extrudable cementitious compositions can be mixed with other admixtures to give an extruded cementitious composite product having the desired properties as described more fully below. More particularly, the cementitious composite products are formulated so as to have greater hardness and compressive strength as compared to ordinary concrete, and have greater toughness in order to better imitate the properties of stone and solid surface materials. Furthermore, the cementitious composite products of the present disclosure show flexibility, unlike conventional stone products.

A. Hydraulic Cement, Water, and Aggregate

Hydraulic cements are materials that can set and harden in the presence of water. The cement can be a Portland cement, modified Portland cement, or masonry cement. For purposes of this disclosure, Portland cement includes all cementitious compositions which have a high content of tricalcium silicate, including Portland cement, cements that are chemically similar or analogous to Portland cement, and cements that fall within ASTM specification C-150-00. Portland cement, as used in the trade, means a hydraulic cement produced by pulverizing clinker, comprising hydraulic calcium silicates, calcium aluminates, and calcium aluminoferrites, and usually containing one or more forms of calcium sulfate as an interground addition. Portland cements are classified in ASTM C 150 as Type I II, III, IV, and V. Other hydraulically settable materials include ground granulated blast-furnace slag, hydraulic hydrated lime, white cement, slag cement, calcium aluminate cement, silicate cement, phosphate cement, high-alumina cement, magnesium oxychloride cement, oil well cements (e.g., Type VI, VII and VIII), and combinations of these and other similar materials.

Pozzolanic materials such as slag, class F fly ash, class C fly ash and silica fume can also be considered to be hydraulically settable materials when used in combination with conventional hydraulic cements, such as Portland cement. A pozzolan is a siliceous or aluminosiliceous material that possesses cementitious value and will, in the presence of water and in finely divided form, chemically react with calcium hydroxide produced during the hydration of Portland cement to form hydratable species with cementitious properties. Diatomaceous earth, opaline, cherts, clays, shales, fly ash, silica fume, volcanic tuffs, pumices, and trasses are some of the better known pozzolans. Certain ground granulated blast-furnace slags and high calcium fly ashes possess both pozzolanic and cementitious properties. Fly ash is defined in ASTM C618.

The amount of hydraulic cement and the pozzolanic material in the extrudable cementitious composition can vary depending on the identities and concentrations of the other components. In general, the combined amount of hydraulic cement and pozzolanic material is in a range of from about 25% to about 75% by weight of the extrudable cementitious composition, more suitably in a range of from about 35% to about 65% by weight of the extrudable cementitious composition, and most suitably in a range of from about 40% to about 60% by weight of the extrudable cementitious composition.

Briefly, within the extruded product, the hydraulic cement forms a cement paste or gel by reacting with water, where the speed of the reaction can be greatly increased through the use of set accelerators or heat curing, and the strength and physical properties of the cementitious composite building products are modulated by a high concentration of fibers. Usually, the amount of hydraulic cement in a cured cementitious composite is described as a dry percentage (e.g., dry weight % or dry volume %). The amount of hydraulic cement can vary in a range from about 40% to about 95% by dry weight, more suitably about 50% to about 80% by dry weight, and most suitably about 60% to about 75% by dry weight. It should be recognized that some products can use more or less hydraulic cement, as needed and depending on other constituents.

The amount of water within the various compositions described herein can be drastically varied over a large range. For example, the amount of water in the extrudable cementitious composition and green extrudate can range from about 15% by weight extrudable cementitious composition to about 75% by weight extrudable cementitious composition, more suitably from about 35% to about 65%, and most suitably from about 40% to about 60% by weight extrudable cementitious composition. On the other hand, the cured composite or hardened cementitious composite product can have free water at less than 10% by weight, more suitably less than about 5% by weight, and most suitably less than about 2% water by weight; however, additional water can be bound with the rheology-modifier, fibers, or aggregates.

The amount of water in the extrudate during the rapid reaction period should be sufficient for curing or hydrating so as to provide the finished properties described herein. Nevertheless, maintaining a relatively low water to cement ratio (i.e., w/c) increases the strength of the final cementitious composite products. Accordingly, the actual or nominal water to cement ratio will typically initially range from about 0.1 to about 0.6.

While it is desirable for the cementitious composite building products to have properties similar to those of stone, it has been discovered that the cementitious building products prepared using the methods of the present disclosure have lower densities as compared to natural stone and solid surface products. More particularly, the cementitious composite building products have a density of at least about 1.3 g/cm$^3$ and less than 3.0 g/cm$^3$, more suitably, at least about 1.3 g/cm$^3$ and less than about 2.3 g/cm$^3$, and even more suitably, from about 1.6 g/cm$^3$ to about 1.7 g/cm$^3$, and even.

Aggregates are also included in the extrudable cementitious composition to provide hardness to the cementitious composite products. More particularly, stronger, harder aggregates are typically included as these aggregates will deteriorate the paste strength of the cementitious composite products less than in conventional products.

The aggregate includes both fine aggregate and coarse aggregate. Examples of suitable materials for coarse and/or fine aggregates include silica, quartz, crushed round marble, glass spheres, granite, limestone, bauxite, calcite, feldspar, alluvial sands, or any other durable aggregate, and mixtures thereof. In a preferred embodiment, the fine aggregate consists essentially of "sand" and the coarse aggregate consists essentially of "rock" (e.g., 3/8 inch and/or 3/4 inch rock) as those terms are understood by those of skill in the art.

In one aspect, the extrudable cementitious composition (and the cementitious composite product) includes two separate sizes of coarse aggregate (i.e., more coarse and less coarse aggregates). More particularly, the extrudable cementitious composition can include more coarse aggregate such as 3/4 inch rock and less coarse aggregate such as 3/8 inch rock.

It should be recognized, that while discussed herein as using two sizes of coarse aggregate, the extrudable cementitious composition may be produced with either solely the less coarse or solely the more coarse aggregate without departing from the present disclosure.

B. Fibers

The extrudable cementitious composition and extruded cementitious composite building products include a relatively high concentration of fibers compared to conventional concrete compositions. Moreover, the fibers are typically substantially homogeneously dispersed throughout the cementitious composition in order to maximize the beneficial properties imparted by the fibers. The fibers are present in order to provide structural reinforcement to the extrudable cementitious composition, green extrudate, and the cementitious composite building product.

Various types of fibers may be used in order to obtain specific characteristics. For example, the extrudable cementitious compositions can include naturally occurring organic fibers extracted from hemp, cotton, plant leaves or stems, hardwoods, softwoods, or the like, fibers made from organic polymers, examples of which include polyester nylon (i.e., polyamide), polyvinyl alcohol (PVA), polyethylene, and polypropylene, and/or inorganic fibers, examples of which include glass, graphite, silica, silicates, microglass made alkali resistant using borax, ceramics, carbon fibers, carbides, metal materials, and the like. Particularly preferred fibers, for example, include glass fibers, woolastanite, abaca, bagasse, wood fibers (e.g., soft pine, southern pine, fir, and eucalyptus), cotton, silica nitride, silica carbide, silica nitride, tungsten carbide, and Kevlar; however, other types of fibers can be used.

The fibers used in making the cementitious compositions can have a high length to width ratio (or "aspect ratio") because longer, narrower fibers typically impart more strength per unit weight to the finished cementitious composite building product. The fibers can have an average aspect ratio of at least about 10:1, preferably at least about 50:1, more preferably at least about 100:1, and most preferably greater than about 200:1.

In one embodiment, the fibers can be used in various lengths such as, for example, from about 0.1 cm to about 2.5 cm, more preferably from about 0.2 cm to about 2 cm, and most preferably about 0.3 cm to about 1.5 cm. In one embodiment, the fibers can be used in lengths less than about 5 mm, more preferably less than about 1.5 mm, and most preferably less than about 1 mm.

In one embodiment, very long or continuous fibers can be admixed into the cementitious compositions. As used herein, a "long fiber" is meant to refer to a thin long synthetic fiber that is longer than about 2.5 cm. As such, a long fiber can be present with lengths ranging from about 2.5 cm to about 10 cm, more preferably about 3 cm to about 8 cm, and most preferably from about 4 cm to about 5 cm.

The concentration of fibers within the extrudable cementitious compositions can vary widely in order to provide various properties to the extruded composition and the finished cementitious composite product. Generally, the fibers can be present in the extrudable composition in an amount of greater than about 1% by volume of extrudable cementitious composition, more suitably greater than about 2%, and more suitably greater than about 3%, and even more suitably from about 3% to about 20%, and most suitably from about 3.5% to about 8% by volume extrudable cementitious composition.

Additionally, specific types of fibers can vary in amount in the compositions. For example, in one embodiment, PVA can be present in the extrudable cementitious composition in an amount of from about 1.5% to about 3.5% by volume extrudable cementitious composition. Soft and/or woods, such as cellulose fibers, can be present in the extrudable cementitious composition in amounts described above with respect to general fibers or present in an amount of from about 1.5% to about 5.0% by volume extrudable cementitious composition.

In one embodiment, the type of fiber can be selected based on the desired structural features of the finished product comprised of the cementitious composite product, where it can be preferred to have dense synthetic fibers compared to light natural fibers or vice versa. Typically, the specific gravity of natural or softwood fibers is about 1.2. On the other hand, synthetic fibers can have specific gravities that range from about 1 for polyurethane fibers, about 1.3 for PVA fibers, about 1.5 for Kevlar fibers, about 2 for graphite and quartz glass, about 2.3 for glass fibers, about 3.2 for silicon carbide and silicon nitride, about 7 to about 9 for most metals with about 8 for stainless steel fibers, about 5.7 for zirconia fibers, to about 15 for tungsten carbide fibers. As such, natural fibers tend to have densities of about 1 or less, and synthetic fibers tend to have densities of from about 1 to about 15.

In one embodiment, a mixture of regular or long length fibers, such as pine, fir, or other natural fibers, may be combined with micro-fibers, such as woolastinite or micro glass fibers, to provide unique properties, including increased toughness, flexibility, and flexural strength, with the larger and smaller fibers acting on different levels within the cementitious composition.

In view of the foregoing, the fibers are added in relatively high amounts in order to yield a cementitious composite building product having increased tensile strength, elongation, deflection, deformability, and flexibility. The fibers contribute to the ability of the cementitious composite building product to be sawed, screwed, ground, and/or milled like stone.

C. Rheology Modifying Agent

In one or more embodiments of the present disclosure, the extrudable cementitious compositions and the cementitious composite building products include a rheology-modifying agent ("rheology-modifier"). The rheology-modifier can be mixed with water and fibers to aid in substantially uniformly (or homogeneously) distributing the fibers within the cementitious composition. Additionally, the rheology-modifier can impart form-stability to an extrudate. In part, this is because the rheology-modifier acts as a binder when the composition is in a green state to increase early green strength so that it can be handled or otherwise processed without the use of molds or other shape-retaining devices. The rheology-modifying agent helps control porosity (i.e., yields uniformly dispersed pores when water is removed by evaporation). Further, the rheology-modifying agent can impart increased toughness and flexibility to a cured cementitious composite product which can result in enhanced deflection characteristics. Thus, the rheology-modifier cooperates with other compositional components in order to achieve a more deformable, flexible, bendable, compactable, tough, and/or elastic cementitious building product.

For example, variations in the type, molecular weight, degree of branching, amount, and distribution of the rheology-modifier can affect the properties of the extrudable cementitious composition, green extrudate, and cementitious composite building products. As such, the type of rheology-modifier can be any polysaccharide, proteinaceous material, and/or synthetic organic material that is capable of being or providing the rheological properties described herein. Examples of some suitable polysaccharides, particularly cellulosic ethers, include methylhydroxyethylcellulose, hydroxymethylethylcellulose, carboxymethylcellulose, methylcellulose, ethylcellulose, hydroxyethylcellulose, and hydroxyethylpropylcellulose, starches such as amylopectin, amylose, starch acetates, starch hydroxyethyl ethers, ionic starches, long-chain alkylstarches, dextrins, amine starches, phosphate starches, and dialdehyde starches, polysaccharide gums such as seagel, alginic acid, phycocolloids, agar, gum arabic, guar gum, locust bean gum, gum karaya, gum tragacanth, and the like. Examples of some proteinaceous materials include collagens, caseins, biopolymers, biopolyesters, and the like. Examples of synthetic organic materials that can impart rheology-modifying properties include petroleum-based polymers (e.g., polyethylene, polypropylene), latexes (e.g., styrene-butadiene), and biodegradable polymers (e.g., aliphatic polyesters, polyhydroxyalkanoates, polylactic acid, polycaprolactone), polyvinyl chloride, polyvinyl alcohol, and polyvinyl acetate. Clay can also act as a rheology-modifier to aid in dispersing the fibers and/or imparting form stability to the green extruded intermediate.

The amount of rheology-modifier within the extrudable cementitious composition and cementitious building product can vary from low to high concentrations depending on the type, branching, molecular weight, and/or interactions with other compositional components. For example, the amount of rheology-modifier present in the extrudable cementitious compositions can range from about 0.1% to about 4% by volume of extrudable cementitious compositions, suitably from about 0.25% to about 2% by volume, even more suitably about 0.5% to about 1.5% by volume, and most suitably from about 0.75% to about 1% by volume of extrudable cementitious compositions. The amount of rheology-modifier present in the cured cementitious composite products can range from about 0.5% to about 1% by volume.

Additionally, examples of synthetic organic materials, which are plasticizers usually used along with the rheology-modifier, include polyvinyl pyrrolidones, polyethylene glycols, polyvinyl alcohols, polyvinylmethyl ethers, polyacrylic acids, polyacrylic acid salts, polyvinylacrylic acids, polyvinylacrylic acid salts, polyacrylimides, ethylene oxide polymers, polylactic acid, synthetic clay, styrene-butadiene copolymers, latex, copolymers thereof, mixtures thereof, and the like. For example, the amount of plasticizers in the extrudable cementitious composition can range from no plasticizer to about 40% plasticizer by weight, more suitably about 1% to about 35% plasticizer by weight, even more suitably from about 2% to about 30%, and most suitably from about 5% to about 25% by weight.

D. Filler

In one embodiment, the extrudable composition, green intermediate extrudate, and cured cementitious composite product can include fillers. Alternatively, there are instances where filler materials are specifically excluded. Fillers, if used at all, are generally included in smaller amounts and mainly to decrease the cost of the extruded products. Because it is desired to obtain extruded products in the form of stone-like building material having the properties of stone, fillers should be selected that do not yield a product that is too soft or difficult to work with. Examples, of fillers include hard silicate, glass, basalt, granite, calcined bauxite. Additional information regarding the types and amounts of fillers that can be used in the cementitious compositions are known to one of ordinary skill in the art. Fillers can further be chosen to add artistic or aesthetic properties to the cementitious composite products.

In one embodiment, the extrudable cementitious compositions can include a widely varying amount of fillers. Specifically, when used, fillers can each independently be present at less than about 10% by weight of extrudable cementitious composition, suitably less than about 7% by weight, more suitably less than about 3% by weight, and most suitably between about 2% to about 12% by weight of extrudable cementitious composition.

In one embodiment, the cured cementitious composite products can include a widely varying amount of fillers. Specifically, when used, fillers can each independently be present at less than about 15% by weight, suitably less than about 10% by weight, more suitably less than about 5% by weight, and most suitably between about 3% to about 15% by weight. In some instances, fillers such as limestone can be present up to about 70% by weight. For example, when included in a cured cementitious composite, vermiculite can be present from about 2% by weight to about 20% by weight, and suitably from about 3% by weight to about 16% by weight.

E. Admixtures and Other Materials

A wide variety of admixtures and other materials can be added to the extrudable cementitious compositions to give the extrudable cementitious compositions and cementitious composite products made therefrom desired properties. Examples of admixtures that can be used in the extrudable cementitious compositions of the disclosure include, but are not limited to, set accelerators, air entraining agents, strength enhancing amines and other strengtheners, dispersants, water reducers, superplasticizers, water binding agents, viscosity modifiers, corrosion inhibitors, pigments, wetting agents, water soluble polymers, water repellents, permeability reducers, pumping aids, fungicidal admixtures, germicidal admixtures, insecticidal admixtures, finely divided mineral admixtures, alkali reactivity reducers, bonding admixtures, nucleating agents, volatile solvents, salts, buffering agents, acidic agents, coloring agents, and the like, and mixtures thereof.

A set accelerator can be included in the extrudable cementitious composition, green intermediate extrudate, and cementitious composite building product. As described herein, the set accelerator can be included so as to decrease the duration of the induction period or hasten the onset of the rapid reaction period. Accordingly, traditional set accelerators such as $MgCl_2$, $NaCO_3$, $KCO_3$ $CaCl_2$ and the like can be used, but may result in a decrease in the compressive strength of the cementitious composite building product; however, this may be a desirable byproduct in order to yield a product that can be sawed, nailed, ground, and milled like stone. For example, the traditional set accelerators can be present in the green intermediate extrudate from about 0.001% to about 5% by total weight, more suitably from about 0.05% to about 2.5% by weight, and most suitably from about 0.11% to about 1% by weight.

Retarding agents, also known as retarders, set retarders, delayed-setting or hydration control admixtures, may also optionally be used to retard, delay, or slow the rate of cement hydration. Furthermore, retarding agents can maintain constant rheology and reduce buildup in the extruder. They can be added to the extrudable composition, green extrudate, and cementitious composite building product. Examples of retarding agents include lignosulfonates and salts thereof, hydroxylated carboxylic acids, borax, gluconic acid, tartaric acid, mucic acid, and other organic acids and their corresponding salts, phosphonates, monosaccharides, disaccharides, trisaccharides, polysaccharides, certain other carbohydrates such as sugars and sugar-acids, starch and derivatives thereof, cellulose and derivatives thereof, water-soluble salts of boric acid, water-soluble silicone compounds, sugar-acids, and mixtures thereof. Exemplary retarding agents are commercially available under the tradename Delvo®, from Masterbuilders (a division of BASF, The Chemical Company, Cleveland, Ohio).

Air-entraining agents are compounds that entrain microscopic air bubbles in cementitious compositions, which then harden into cementitious composite products having microscopic air voids. Entrained air dramatically improves the durability of product exposed to moisture during freeze thaw cycles. Air-entraining agents can also reduce the surface tension of an extrudable cementitious composition at low concentration. Air entrainment can also increase the workability of extrudable cementitious compositions and reduce segregation and bleeding. Examples of suitable air-entraining agents include wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, inorganic air entrainers, synthetic detergents, the corresponding salts of these compounds, and mixtures of these compounds. Air-entraining agents are added in an amount to yield a desired level of air in an extrudable cementitious composition.

In another alternative embodiment, the concrete composition does not include any air entraining agent but rather a greater quantity of superplasticizer, as discussed below.

Strength enhancing amines are compounds that improve the compressive strength of cementitious composite products made from extrudable cementitious compositions. The strength enhancing amine includes one or more compounds from the group selected from poly(hydroxyalkylated)polyethyleneamines, poly(hydroxyalkylated)poly-ethylenepolyamines, poly(hydroxyalkylated)polyethyleneimines, poly(hydroxyl-alkylated)polyamines, hydrazines, 1,2-diaminopropane, polyglycoldiamine, poly-(hydroxylalkyl) amines, and mixtures thereof. An exemplary strength enhancing amine is 2,2,2,2 tetra-hydroxydiethylenediamine.

Dispersants are used in extrudable cementitious compositions to increase flowability without adding water. Dispersants can be used to lower the water content in the extrudable cementitious composition to increase strength without adding additional water. A dispersant, if used, can be any suitable dispersant such as lignosulfonates, beta naphthalene sulfonates, sulfonated melamine formaldehyde condensates, polyaspartates, polycarboxylates with and without polyether units, naphthalene sulfonate formaldehyde condensate resins, or oligomeric dispersants. Depending on the type of dispersant, the dispersant may function as a plasticizer, high range water reducer, fluidizer, antiflocculating agent, and/or superplasticizer.

One class of dispersants includes mid-range water reducers. Mid-range water reducers should at least meet the requirements for Type A in ASTM C 494.

Another class of dispersants includes high range water-reducers (HRWR). These dispersants are capable of reducing water content of a given extrudable cementitious composition by as much as from about 10% to about 50%. HRWRs can be used to increase strength or to greatly increase the slump to produce a "flowing" extrudable cementitious composition without adding additional water. HRWRs that can be used in the present disclosure include those covered by ASTM C 494 and types F and G, and Types 1 and 2 in ASTM C 1017. Examples of HRWRS are described in U.S. Pat. No. 6,858,074, which is hereby incorporated by reference to the extent that it is consistent herewith.

Dampproofing admixtures reduce the permeability of extrudable cementitious composition that have low cement contents, high water-cement ratios, or a deficiency of fines in the aggregate. These admixtures retard moisture penetration into dry concrete and include certain soaps, stearates, and petroleum products.

Permeability reducers are used to reduce the rate at which water under pressure is transmitted through the extrudable cementitious composition (and the cementitious composite products). Silica fume, fly ash, ground slag, natural pozzolans, water reducers, and latex can be employed to decrease the permeability of the extrudable cementitious composition.

Shrinkage reducing agents include but are not limited to alkali metal sulfate, alkaline earth metal sulfates, alkaline earth oxides, e.g., sodium sulfate and calcium oxide.

Finely divided mineral admixtures are materials in powder or pulverized form added to extrudable cementitious compositions before or during the mixing process to improve or change some of the plastic or hardened properties of Portland cement. The finely divided mineral admixtures can be classified according to their chemical or physical properties as: cementitious materials; pozzolans; pozzolanic and cementitious materials; and nominally inert materials. Nominally inert materials include finely divided raw quartz, dolomites, limestones, marble, granite, and others.

Natural and synthetic admixtures are used to color extrudable cementitious composition for aesthetic and safety reasons. Coloring admixtures are usually composed of pigments and include carbon black, iron oxide, phthalocyanine, umber, chromium oxide, titanium oxide and cobalt blue.

In one embodiment, a substantially cured cementitious composite product that is reinforced with fibers can be coated with a protective or sealing material such as a paint, stain, varnish, texturizing coating, and the like. As such, the coating can be applied to the cementitious composite building product after it is substantially cured. For example, the cementitious building product can be stained so that the fibers present on the surface are a different shade from rest of the product, and/or texturized so as to resemble a stone product.

Sealants known in the concrete industry can be applied to the surface and/or incorporated into the cementitious composition in order to provide waterproofing properties. These include silanes and siloxanes.

Manufacturing Cementitious Composite Products

FIG. 1 is a schematic diagram that illustrates an embodiment of a manufacturing system and equipment that can be used during the formation of an extrudable cementitious composition, green intermediate extrudate, cementitious composite product, and/or cementitious composite building product. It should be recognized that this is only one example illustrated for the purpose of describing a general processing system and equipment, where various additions and modifications can be made thereto in order to prepare the cementitious composite products (and building products). Also, the schematic representation should not be construed in any limiting manner as to the presence, arrangement, shape, orientation, or size of any of the features described in connection therewith. With that said, a more detailed description of the system and equipment that can prepare the extrudable cementitious compositions as well as cementitious composite building products that are in accordance with the present disclosure is provided.

Referring now to FIG. 1A, an embodiment of an extrusion system 10 in accordance with the present disclosure is provided. Such an extrusion system 10 includes a first mixer 16, optional second mixer 18, and an extruder 24. The first mixer 16 is configured to receive at least one feed of materials through at least a first feed stream 12 for being mixed into a first mixture 20 (for example, in one embodiment the first mixture 20 is the fibrous mixture described above). After adequate mixing, which can be performed under high shear, while maintaining a temperature below that which accelerates hydration, the first mixture 20 is removed from the first mixer 16 as flow of material ready for further processing.

By mixing the first mixture 20 apart from any additional components, the respective mixed components can be homogeneously distributed throughout the composition. For example, it can be advantageous to homogeneously mix the fibers with at least the rheology modifier and water before combining them with the additional components. As such, the rheology-modifier, fibers, and/or water are mixed under high shear so as to increase the homogeneous distribution of fibers therein. The rheology modifying agent and water form a plastic composition having high yield stress and viscosity that is able to transfer the shearing forces from the mixer down to the fiber level. In this way, the fibers can be homogeneously dispersed throughout the fibrous mixture using much less water than required in conventional procedures, which typically require up to 99% water to disperse the fibers.

The optional second mixer 18 has a second feed stream 14 that supplies the material to be mixed into a second mixture 22, where such mixing can be enhanced by the inclusion of a heating element. For example, the second mixer 18 can receive and mix the additional components, such as the additional water, set accelerators, hydraulic cement, plasticizers, aggregates, nucleating agents, dispersants, polymeric binders, volatile solvents, salts, buffering agents, acidic agents, coloring agents, fillers, and the like before combining them with other components to form the extrudable cementitious composition. The second mixer 18 is optional because the additional components could be mixed with the fibrous mixture in the first mixer 16.

As in the illustrated schematic diagram, the extruder 24 includes an extruder screw 26, optional heating elements (not shown), and a die head 28 with a die opening 30. Optionally, the extruder can be a single screw, twin screw, and/or a piston-type extruder. After the first mixture 20 and second mixture 22 enter the extruder they can be combined and mixed into an extrudable cementitious composition.

By mixing the components, an interface is created between the different components, such as the rheology-modifying agent and fibers, which allows for individual fibers to pull apart from each other. By increasing the viscosity and yield stress with the rheology-modifying agent, more fibers can be substantially homogenously distributed throughout the mixture and final cured product. Also, the cohesion between the different components can be increased so as to increase interparticle and capillary forces for enhanced mixing and form-stability after extrusion. For example, the cohesion between the different components can be likened to clay so that the green extrudate can be placed on a pottery wheel and worked similar to common clays that are fabricated into pottery.

In one embodiment, additional feed streams (not shown) can be located at any position along the length of the extruder 24. The availability of additional feed streams can enable the manufacturing process to add certain components at any position so as to modify the characteristics of the extrudable cementitious composition during mixing and extruding as well as the characteristics of the green intermediate extrudate after extrusion. For example, in one embodiment it can be advantageous to supply the set accelerator into the composition within about 60 minutes to within about 1 second before being extruded. More preferably, the set accelerator is mixed into the composition within about 45 minutes to about 5 seconds before being extruded, even more suitably within about 30 minutes to about 8 seconds, and most suitably within about 20 minutes to about 10 seconds before being extruded. This can enable the green intermediate extrudate to be configured for increased form-stability and a shortened induction period before the onset of the rapid reaction period.

With continuing reference to FIG. 1A, as the extrudable cementitious composition moves to the end of the extruder 24, it passes through the die head 28 before being extruded at the die opening 30. The die head 28 and die opening 30 can be configured into any shape or arrangement so long as to produce a green intermediate extrudate (also referred to herein as green extrudate or extrudate) that is capable of being further processed or finished into a cementitious composite building product. In the illustrated embodiment, it can be advantageous for the die opening 30 to have a circular diameter so that the extrudate 32 has a rod-like shape. Other exemplary cross-sectional shapes are illustrated in FIG. 1C, including hexagonal 42, rectangular 44, square 46, or I-beam 48. The extruded products can be characterized as being immediately form-stable while in the green state. That is, the extrudate can be immediately processed without deforming, wherein the processing can include cutting, sawing, shaping, grinding, milling, forming, drilling, and the like. As such, the extrudate in the green state does not need to be cured before being prepared into the size, shape, or form of the finished cementitious composite building product. For example, the green-state processing can include the following: (a) creating stone-like surfaces, by milling, sawing, cutting, grinding or the like, that have specified dimensions, such as width, thickness, length, radius, diameter, surface texture, and the like; (b) bending the extrudate so as to form a curved cementitious product, which can be of any size and shape, such as, a curved countertop or edge, and other ornamental and/or structural members; (c) creating products having lengths of 6 ft 9 in, 8 ft 8 in, 9 ft 1 in, 27 ft, 40 if, 41 ft, 60 if, 61 ft, 80 ft, 81 ft, and the like; (d) texturizing with rollers, which can impart stone and or marble-like surfaces to the cementitious composite building product; (e) having the surface painted, waterproofed, or otherwise coated, which can apply coatings comprised of silanes, siloxanes, latex, and the like; and (1) transported, shipped, or otherwise moved and/or handled. Also, the byproducts that are produced from the green-state processing can be placed into the feed compositions and reprocessed. Thus, the green cementitious byproducts can be recycled, which can significantly reduce waste and manufacturing costs.

FIG. 1B is a schematic diagram of a die head 29 that can be used with the extrusion process of FIG. 1A. As such, the die head 29 includes a die opening 30 that has a hole forming member 31. The hole forming member 31 can be circular as shown, or have any cross-sectional shape. As such, the hole forming member 31 can form a hole in the extrudate, which is depicted in FIG. 1C. Since the extrudate can be form-stable immediately upon extrusion, the hole can retain the size and shape of the hole forming member 31. Additionally, various die heads having hole forming members that can produce annular extrudates are well known in the art and can be adapted or modified, if needed, to be usable with the extrusion processes in accordance with the present disclosure.

With reference now to FIG. 1C, additional embodiments of extrudates 40 are depicted. Accordingly, the die head and die opening of FIG. 1A or 1B can be modified or altered so as to provide extrudates 40 having various cross-sectional areas, where the extrudate 40 cross-sectional area can be substantially the same as the cross-sectional area of the die opening. For example, the cross-sectional area can be a hexagon 42, rectangle 44 (e.g., two-by-four, one-by-ten, etc.), square 46, I-beam 48, or a cylinder 50, optionally having a continuous hole 49. Also, additional cross-sectional shapes can be prepared via extrusion. More particularly, the die head and die opening of FIG. 1B can be used so that the hexagon 42, rectangle 44, square 46, I-beam 48, or cylinder 50 can optionally include continuous circular holes 51, rectangular holes 53, square holes 57, or the like. Also, complex dies heads and openings can be used for preparing the cylinder 50 having the continuous hole 49 and a plurality of smaller holes 51. Moreover, any general cross-sectional shape can be further processed into a specific shape such as, for example, a two-by-four from a four-by-four square shape. Alternatively, the die orifice may yield oversized products that are later trimmed to the desired specifications in order to ensure greater uniformity.

Accordingly, the foregoing processes can be usable for extruding building products with one or more continuous holes to reduce weight of the products. For example, a countertop-like material can be extruded having one or more holes into which rebar can be inserted, either while in a green state or after curing. In the case of a cured countertop material, the rebar may be held in place within the hole using epoxy or other adhesive to provide strong bonding between the rebar and material. For example, the cylinder 50 of FIG. 1C, as well as the other shapes, can be fabricated into large countertops. These structures can optionally include a large interior opening 49 to reduce the mass and cost, along with smaller holes 51 in the wall to permit the insertion of strengthening rebar, as shown.

In one embodiment, the extrudable cementitious composition is de-aired before being extruded. While some processes can employ a specific de-airing process to remove a substantial amount of air from the extrudable cementitious composition, other processes can remove the air by the mixing process that occurs in the extruder. In any event, the active or passive de-airing can provide an extrudate that does not have large air voids or cellular formations. In general, it is preferable to de-air the extrudable cementitious composition as this decreases the porosity of the composition, and thus, increases the strength of the final product. For example, a de-aired cementitious composite can have entrapped air in an amount of from about 0% to about 10%, more suitably from about 0.1% to about 5%, and most suitably about 0.2% to about 3%. Thus, the extrudate and resulting cementitious composite building product can be fabricated so as to be substantially or completely devoid of any multi-cellular formations.

In one embodiment, the extrudate can be further processed in a dryer or autoclave. The dryer can be useful for drying the extrudate so as to remove excess water from the hardened product. In another embodiment, the extrudate can be processed through an autoclave in order to increase the rate of curing and strength development to produce an increase in strength of the product of from about 50% to about 100%.

FIG. 2 is a schematic diagram depicting an alternative extrusion process that can be used to prepare the cementitious composite building products in accordance with the present disclosure. As such, the extrusion process can be considered to use a roller-extrusion system 200 that uses rollers to extrude the extrudable cementitious composition into a green intermediate extrudate. Such a roller extrusion system 200 includes a mixer 216 configured to receive at least one feed of materials through a feed stream 212 for being mixed into a mixture 220. After adequate mixing, which can be performed as described herein, the mixture 220 is removed from the mixer 216 as flow of material ready for further processing.

The mixture 220 is then applied to a conveyor 222 or other similar transporter so as to move the extrudable cementitious composition from the site of application. This allows the composition to be formed into a cementitious flow 224 that can be processed. As such, the cementitious flow 224 can be passed under a first roller 226 that is set at a predefined distance from the conveyor 222 and having a predefined cross-sectional area with respect thereto, which can press or shape the cementitious flow 224 into a green intermediate extrudate 228. Optionally, the conveyor 222 can then deliver the green intermediate extrudate 228 through a first calender 230 comprised of an upper roller 230a and a lower roller 230b. The calender 230 can be configured to have a predefined cross-sectional area so that the green intermediate extrudate 228 is further shaped and/or compressed into a shaped green intermediate extrudate 242. Also, an optional second calender 240 comprised of a first roller 240a and a second roller 240b can be used in place of the first calender 230 or in addition thereto. A combination of calenders 230, 240 can be favorable for providing a green intermediate extrudate that is substantially shaped as desired. Alternatively, the first roller 226 can be excluded and the cementitious flow 224 can be processed through any number of calenders 230, 240.

Additionally, the shaped green intermediate extrudate 242, or other extrudate described here, such as from the process illustrated in FIG. 1A, can be further processed by a processing apparatus 244. The processing apparatus 244 can be any type of equipment or system that is employed to process the green intermediate extrudate materials as described herein. As such, the processing apparatus 244 can saw, grind, mill, cut, bend, coat, dry or otherwise shape or further process the shaped green intermediate extrudate 242 into a processed extrudate 246. Also, the byproduct 260 obtained from the processing apparatus 244 can be recycled into the feed composition 212, or applied to the conveyor 222 along with the mixture 220.

In one embodiment, a combined curing/drying process can be used to cure and dry the hydraulic cement to form the extruded cementitious composite. For example, the combined curing/drying process can be performed at a temperature of from about 75-95° C. for 48 hours in order to obtain about 80% of the final strength. However, larger blocks can take additional time in any curing and/or drying process. In another embodiment, the combined curing/drying process can be conducted in an autoclave. For example, the autoclave can cure/dry at a temperature of about 190° C., at about 12 bars, for about 12 hours.

Optionally, the extrudate can be covered in plastic and/or stored for a period of time to allow the extrudate to cure. This can allow the extrudate to harden over time in order to produce the requisite strength for the cured cementitious composite product. For example, after 28 days, the cured cementitious composite product can have about 80% of final strength, and can be placed in a dryer to remove residual water.

In another embodiment, combined steam curing and autoclaving processes are used to cure the hydraulic cement. Typically, the cement is initially steam cured for about 1 to about 6 hours and is then autoclaved at temperatures of about 190° C. or greater at 12 bars for approximately 12 hours. By autoclaving, the resulting cementitious product obtains about 100% of additional strength.

In one embodiment, the green intermediate extrudate can be further processed by causing or allowing the hydraulic cement within the green intermediate extrudate to hydrate or otherwise cure so as to form a solidified cementitious composite building product. As such, the cementitious composite building product can be prepared so as to be immediately form-stable after being extruded so as to permit the handling thereof without breakage. More preferably, the extrudable cementitious composition, or green intermediate extrudate can be form-stable within minutes, more suitably within 10 minutes, even more suitably within 5 minutes, and most suitably within 1 minute after being extruded. The most optimized and preferred composition and processing can result in a green intermediate extrudate that is form-stable upon extrusion. The use of a rheology-modifying agent can be used to yield extrudates that are immediately form-stable even in the absence of hydration of the hydraulic cement binder.

In order to achieve form-stability, the manufacturing process can either simply allow the green intermediate extrudate to sit and set without any additional processing or it can be caused to hydrate and/or set. When the manufacturing includes causing the green intermediate extrudate to hydrate, set or otherwise cure, the manufacturing system can include a dryer, heater or autoclave. The dryer or heater can be configured to generate enough heat to drive off or evaporate the water from the extrudate so as to increase its rigidity and porosity or induce the onset of the rapid reaction period. On the other hand, an autoclave can provide pressurized steam to induce the onset of the rapid reaction period.

In one embodiment, the green intermediate extrudate can be allowed or induced to initiate the rapid reaction period as described herein in addition to including a set accelerator within the extrudable cementitious composition. As such, the green intermediate extrudate can be induced to initiate the rapid reaction period by altering the temperature of the extrudate or changing the pressure and/or relative humidity. Also, the rapid reaction period can be induced by configuring the set accelerator to initiate the reactions within a predetermined period of time after being extruded.

In one embodiment, the preparation of a cementitious composite or cementitious composite building product can include substantially hydrating or otherwise curing the green intermediate extrudate into the cementitious composite building product within a shortened period, or a faster reaction rate, compared to conventional concretes or other hydraulically settable materials. As a result, the cementitious composite building product can be substantially cured or hardened, depending on the type of binder that is used, within about 48 hours, more suitably within about 24 hours, even more suitably within 12 hours, and most suitably within 6 hours. Thus, the manufacturing system and process can be configured in order to obtain fast cure rates so that the cementitious composite building product can be further processed or finished.

In one embodiment, a curing or cured cementitious composite can be further processed or finished. Such processing can include sanding, cutting, drilling, grinding, milling and/or shaping the cementitious composite product into a desired shape, wherein the composition lends to such shaping. Accordingly, when a cementitious composite building product is cut, the fibers and rheology-modifier can contribute to the straight cut-lines that can be formed without cracking or chipping the cut surface or internal aspects of the material. This enables the cementitious composite building product to be a stone substitute because a larger slab of material can be purchased by a consumer and cut with standard equipment into the desired shapes and lengths.

In one embodiment, the form-stable green intermediate extrudate can be processed through a system that modifies the external surface of the product. One example of such a modification is to pass the green intermediate extrudate through a calender or series of rollers that can impart a stone-like appearance. As such, the cementitious composite building product can be a stone substitute having the aesthetic appearance and texture of stone or other solid surface material. Also, certain colorants, dyes, and/or pigments can be applied to the surface or dispersed within the cementitious composite building product so as to achieve the color of various types of stones.

The green extruded intermediates can also be reshaped while in a green state to yield, for example, curved products or other building products having a desired radius. This is a significant advantage over traditional stone products, which are difficult to curve and/or which must be ground and/or milled to have a curved profile. In one embodiment, the cementitious composite building product can be sanded and/or buffed in a manner that exposes the fibers at the surface. Due to the high percentage of fiber in the product, a large number of fibers can be exposed at the surface. This can provide for interesting and creative textures that can increase the aesthetic qualities of the product.

Cementitious Composite Building Products

The present disclosure provides the ability to manufacture cementitious composite building products having virtually any desired size and shape, whether extruded in the desired shape or later cut, ground, milled or otherwise formed into the desired size and shape. Examples include architectural products such as countertops, tiles, cladding, roof tiles, and the like, as well as structural products such as pre-cast or pre-formed members with extrusion or injected molded products. Accordingly, the cementitious composite building product can be load bearing or non-load bearing. Thus, the cementitious composite building product can be used as a stone substitute for almost any building application.

The cured cementitious composite product can be configured to have various properties in order to function as a stone substitute. An example of a cured cementitious composite product that can function as a stone substitute can have any of the following properties: have a hardness and/or toughness similar to stone and other solid surface materials such as to prevent cracking and splitting of the product; having a high compressive strength to allow for support and durability for use in stone-like products; and high flexural strength to allow for flexibility for use in manipulating the product and/or bending and curving the product into a desired product shape. These properties are achieved while keeping the bulk density of the product significantly lower than that of natural stone and solid-surface materials.

In one embodiment, the green intermediate extrudate or cementitious composite can be prepared into a cementitious composite building product as described above. As such, in one embodiment of the cured cementitious composite product can be characterized by having a specific gravity inclusive of pores or cellular formations can be greater than about 1.3 or range from about 1.3 to about 3.0, more suitably from about 1.3 to about 2.3, and most suitably from about 1.6 to about 1.7.

One embodiment of the cured composite can be characterized by having a compressive strength of at least about 6,000 psi, more suitably at least about 8,000 psi, and even more suitably at least about 10,000 psi.

In one embodiment, the cured composite can have a flexural strength of at least about 1,500 psi, more suitably at least about 2,000 psi, more suitably at least about 3,000 psi, and more suitably at least about 4,000 psi, and even more suitably, from about 2,500 psi to about 6,000 psi. For example, in one embodiment, the cured composite has a flexural strength of up to about 5,700 psi.

With these above strengths, it should be recognized by one skilled in the art that the cured composites can function as substitutes of natural stone and solid surface products without the use of reinforcing members such as rebar or glass fibers. This provides for a less expensive and less labor intensive substitute for building materials.

In one embodiment, the cured composite can further have a flexural modulus of at least about 500,000, more suitably at least 1,000,000, even more suitably from about 500,000 psi to about 2,000,000 psi, and even more suitably from about 1,000,000 psi to about 1,750,000 psi.

As noted above, the cured composite further includes a hardness similar to that of stone and other solid-surface materials. More particularly, the cured cementitious composite product includes a hardness of at least 4 MOH; more suitably, at least about 5 MOH; more suitably, at least about 6 MOH, and even more suitably, from about 7 MOH to about 8 MOH.

EXAMPLES OF EMBODIMENTS OF THE DISCLOSURE

Example 1

An extrudable cementitious composition was prepared in accordance with the present disclosure. The components of the composition were mixed according to the normal mixing procedures described above and in the references incorporated herein. The extrudable composition was formulated as illustrated in Table 1.

TABLE 1

| Component | Amount in Composition |
|---|---|
| Water | 11.00 |
| Cement | 25.00 |
| PVA fiber | 1.25 |
| Silica Sand (#70) | 17.50 |
| Methocel ™ (Dow Chemical Company) | 1.0 |
| Delvo ® Admixture (BASF Construction Chemicals) | 0.1 |
| Total | 55.85 |

Following mixing, the composition was extruded through a die head having a rectangular opening of about 1 inch by about 4 inches. Four rectangular board samples were prepared. As the first board came out of the extruder, it was twisted in opposite directions and placed on a flat surface. The second board was removed in a plastic hammock and placed next to the first board on the flat surface. The third board was pulled directly onto the flat surface with no agitation. All three samples above were placed directly into the steam cure chamber to be removed in 7 days. The fourth sample was extruded and left to cure on the conveyor without any movement or agitation. Various physical properties of the boards were tested after 24 hours, 48 hours, 72 hours, 7 days, and 9 days from curing. The results (averaged) are shown in Table 2.

TABLE 2

| Property | 24 hours | 48 hours | 72 hours | 7 days | 9 days |
|---|---|---|---|---|---|
| Bulk density (g/cc) | 1.79 | 1.85 | 1.81 | 1.81 | 1.85 |
| Flexural Strength | 2,563.15 | 2,374.63 | 2,480.58 | 2,714.57 | 2,767.62 |
| Flexural Modulus | 1,556,360.00 | 1,499,910.00 | 1,577,430.00 | 1,674,990.00 | 1,723,940.00 |
| Toughness (psi) | 5.01 | 3.92 | 3.63 | 3.70 | 4.52 |

The boards were then visually examined to determine if there was a difference in appearance caused by the different handling methods. All boards, except for the second board, which was placed into the plastic hammock, appeared to contain cracks, however, it was determined that the cracks were silica sand alignment.

Example 2

An extrudable composition for producing a Dahl tile for pavers was prepared in accordance with the present disclosure. The components of the composition were mixed according to the normal mixing procedures described above and in the references incorporated herein. The extrudable composition was formulated as illustrated in Table 3.

TABLE 3

| Component | Amount in Composition |
|---|---|
| Water | 14.00 |
| Cement | 25.00 |
| PVA fiber | 1.50 |
| HW | 1.50 |
| Silica Sand (#60) | 15.00 |
| Methocel | 0.80 |
| Total | 57.80 |

HW = hardwood

After mixing, the composition was extruded. Three samples of the extruded composition were cured in plastic at ambient conditions and then placed in a steam chamber. The samples were then placed in a dry oven until they reached weight equilibrium. The samples were finally characterized by testing bulk density, flexural strength, flexural modulus, and toughness. The results are shown in Table 4.

TABLE 4

| Property | Sample 1 | Sample 2 | Sample 3 | Average of Samples |
|---|---|---|---|---|
| Bulk Density (g/cc) | 1.53 | 1.51 | 1.53 | 1.52 |
| Flexural Strength (psi) | 3,193.90 | 2,953.90 | 2,953.71 | 2,876.52 |
| Flexural Modulus (psi) | $1.03 \times 10^6$ | $1.05 \times 10^6$ | $1.06 \times 10^6$ | 1,044,540.00 |
| Toughness (psi) | | | | 0.85 |

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A cementitious composite product having stone-like properties, the product comprising an extrudable cementitious composition comprised of a hydraulic cement, aggregate, a rheology-modifying agent, and from about 1.5% (by volume of the extrudable cementitious composition) to about 5.0% (by volume of the extrudable cementitious composition) cellulose fibers and from about 1.5% (by volume of the extrudable cementitious composition) to about 3.5% (by volume of the extrudable cementitious composition) polyvinyl alcohol fibers, wherein the composition comprises from 3.5% (by volume of the extrudable cementitious composition) to 8% (by volume of the extrudable cementitious composition) total fibers, the fibers substantially homogeneously distributed through the extrudable cementitious composition, wherein the cementitious composite product has a hardness value of at least 4 MOH and a bulk density of from about 1.3 g/cm$^3$ to about 2.3 g/cm$^3$.

2. The cementitious composite product as set forth in claim 1, wherein the extrudable cementitious composition comprises fine aggregate and coarse aggregate.

3. The cementitious composite product as set forth in claim 1, wherein the rheology-modifying agent is included in an amount of from about 0.1% (by volume of the extrudable cementitious composition) to about 4% (by volume of the extrudable cementitious composition).

4. The cementitious composite product as set forth in claim 1, wherein the cementitious composite product has a hardness value of at least about 5 MOH.

5. The cementitious composite product as set forth in claim 1, wherein the cementitious composite product has a compressive strength of at least about 6,000 psi.

6. The cementitious composite product as set forth in claim 1, wherein the cementitious composite product has a compressive strength of at least about 8,000 psi.

7. The cementitious composite product as set forth in claim 1, wherein the cementitious composite product has a compressive strength of at least about 10,000 psi.

8. The cementitious composite product as set forth in claim 1, wherein the cementitious composite product has a flexural strength of at least about 1,500 psi.

9. The cementitious composite product as set forth in claim 1, wherein the cementitious composite product has a flexural strength of at least about 4,000 psi.

10. The cementitious composite product as set forth in claim 1, wherein the cementitious composite product has a flexural strength of about 5,700 psi and a bulk density of from about 1.6 g/cm$^3$ to about 1.7 g/cm$^3$.

11. The cementitious composite product as set forth in claim 1 comprising no reinforcing member.

12. The cementitious composite product as set forth in claim 1, further comprising at least one admixture in the extrudable concrete composition, wherein the admixture is selected from the group consisting of set accelerators, air entraining agents, strength enhancing amines and other strengtheners, dispersants, water reducers, superplasticizers, water binding agents, viscosity modifiers, corrosion inhibitors, pigments, wetting agents, water soluble polymers, water repellents, permeability reducers, finely divided mineral admixtures, nucleating agents, volatile solvents, salts, buffering agents, acidic agents, coloring agents, and mixtures thereof.

13. The cementitious composite product as set forth in claim 1, wherein the cementitious composite product is capable for use in a countertop, tile, cladding, and roofing tile.

14. A method for manufacturing a cementitious composite product having stone-like properties, the method comprising:
mixing together water, fibers and a rheology-modifying agent to form a fibrous mixture in which the fibers are substantially homogeneously dispersed;
adding a mix of hydraulic cement and aggregate to the fibrous mixture to yield an extrudable cementitious composition having a plastic consistency and which includes from about 1.5% (by volume of the extrudable cementitious composition) to about 5.0% (by volume of the extrudable cementitious composition) cellulose fibers and from about 1.5% (by volume of the extrudable cementitious composition) to about 3.5% (by volume of the extrudable cementitious composition) polyvinyl alcohol fibers, and wherein the composition comprises from 3.5% (by volume of the extrudable cementitious composition) to 8% (by volume of the extrudable cementitious composition) total fibers;
extruding the extrudable cementitious composition into a green intermediate extrudate having a predefined cross-sectional area, the extrudate being form-stable upon extrusion and capable of retaining substantially the cross-sectional area so as to permit handling without breakage; and
causing or allowing the hydraulic cement to cure to form the cementitious composite product, wherein the cementitious composite product has a hardness value of at least 4 MOH and a bulk density of from about 1.3 g/cm$^3$ to about 2.3 g/cm$^3$.

15. The method as set forth in claim 14, wherein the extrudable cementitious composition comprises fine aggregate and coarse aggregate.

16. The method as set forth in claim 14, wherein the extrudable cementitious composition comprises from about 0.1% (by volume of the extrudable cementitious composition) to about 4% (by volume of the extrudable cementitious composition) rheology-modifying agent.

17. The method as set forth in claim 14, wherein the cementitious composite product has a hardness value of at least about 5 MOH.

18. The method as set forth in claim 14, wherein the cementitious composite product has a compressive strength of at least about 6,000 psi.

19. The method as set forth in claim 14, wherein the cementitious composite product has a compressive strength of at least about 8,000 psi.

20. The method as set forth in claim 14, wherein the cementitious composite product has a compressive strength of at least about 10,000 psi.

21. The method as set forth in claim 14, wherein the cementitious composite product has a flexural strength of at least about 1,500 psi.

22. The method as set forth in claim 14, wherein the cementitious composite product has a flexural strength of at least about 4,000 psi.

23. The method as set forth in claim 14, wherein the cementitious composite product has a flexural strength of about 5,700 psi and a bulk density of from about 1.6 g/cm$^3$ to about 1.7 g/cm$^3$.

24. The method as set forth in claim 14, wherein the cementitious composite product comprises no reinforcing member.

25. The method as set forth in claim 14, further comprising adding at least one admixture to the fibrous mixture, wherein the admixture is selected from the group consisting of set accelerators, air entraining agents, strength enhancing amines and other strengtheners, dispersants, water reducers, superplasticizers, water binding agents, viscosity modifiers, corrosion inhibitors, pigments, wetting agents, water soluble polymers, water repellents, permeability reducers, finely divided mineral admixtures, nucleating agents, volatile solvents, salts, buffering agents, acidic agents, coloring agents, and mixtures thereof.

26. The method as set forth in claim 14, wherein the cementitious composite product is capable of use in a countertop, tile, cladding, and roofing tile.

27. The cementitious composite product as set forth in claim 1, wherein the fibers have an aspect ratio of at least about 10:1.

* * * * *